United States Patent [19]

Yoshida et al.

[11] Patent Number: 5,155,083
[45] Date of Patent: Oct. 13, 1992

[54] CATALYST FOR REDUCING NITROGEN OXIDES AND PROCESS FOR MAKING THE CATALYST

[75] Inventors: Naomi Yoshida; Hitoshi Yamasaki; Ikuhisa Hamada; Yasuyoshi Kato; Kunihiko Konishi; Toshiaki Matsuda; Yuji Fukuda, all of Kure, Japan

[73] Assignee: Babcock-Hitachi Kabushiki Kaisha, Tokyo, Japan

[21] Appl. No.: 525,535

[22] Filed: May 18, 1990

[30] Foreign Application Priority Data

May 19, 1989 [JP] Japan ............................ 1-126456
Aug. 1, 1989 [JP] Japan ............................ 1-200070

[51] Int. Cl.$^5$ .................. B01J 21/06; B01J 21/08; B01J 23/22; B01J 23/28; B01J 23/30
[52] U.S. Cl. ........................ 502/242; 502/527; 502/247; 502/254; 502/255; 423/239 A
[58] Field of Search ............ 502/242, 527, 247, 254, 502/255; 423/239 A

[56] References Cited

U.S. PATENT DOCUMENTS

| | | |
|---|---|---|
| 3,189,563 | 6/1965 | Hamel ........................ 502/527 X |
| 3,929,671 | 12/1975 | Nakamura et al. .......... 502/242 X |
| 4,038,214 | 7/1977 | Gotoh et al. ................ 502/257 |
| 4,280,926 | 7/1981 | Abe et al. .................... 502/527 X |
| 4,282,115 | 8/1981 | Atsukawa et al. .......... 423/239 A |
| 4,732,879 | 3/1988 | Kalinowski et al. ......... 502/527 X |

FOREIGN PATENT DOCUMENTS

| | | |
|---|---|---|
| 0336882 | 10/1989 | European Pat. Off. ....... 502/527 |
| 2137331 | 2/1973 | Fed. Rep. of Germany . |
| 3433197 | 3/1989 | Fed. Rep. of Germany . |
| 2103356 | 3/1972 | France ........................ 502/527 |
| 55-155745 | 12/1980 | Japan .......................... 502/527 |
| 56-70839 | 6/1981 | Japan .......................... 502/527 |
| 2026336 | 2/1980 | United Kingdom . |

OTHER PUBLICATIONS

Schleppy, R., Jr., "Reduction of Nitric Oxide on Fiber Glass", Ind. Eng. Chem, Prod. Res. Dev., vol. 15, No. 3, pp. 172–176.

Primary Examiner—W. J. Shine
Assistant Examiner—D. J. McGinty
Attorney, Agent, or Firm—Fay, Sharpe, Beall, Fagan, Minnich & McKee

[57] ABSTRACT

A catalyst for reducing nitrogen oxides in the exhaust gas with ammonia, having a catalyst composition coated on an inorganic fiber cloth as a substrate is provided. The inorganic fiber cloth is impregnated with at least one inorganic oxide selected from silica and said catalyst composition, preferably with an organic binder like polyvinyl alcohol, so that the weight ratio of the inorganic oxide/said inorganic fiber cloth is in the range of 0.05 to 0.8 and the inorganic oxide is substantially placed between the fibers constituting said inorganic fiber cloth.

The above inorganic fiber cloth is preferably a glass fiber cloth, more preferably a glass fiber cloth which surface is acid-treated to have a layer deficient in alumina and calcium oxide.

9 Claims, 5 Drawing Sheets

FIG. 1
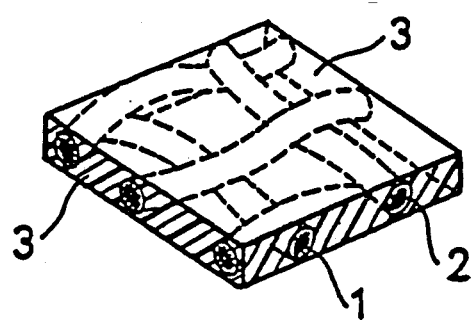
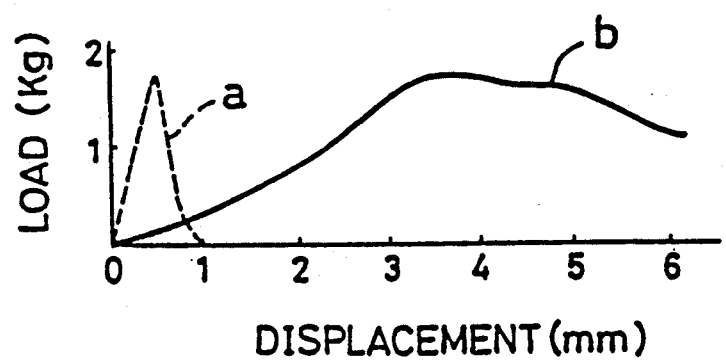
FIG. 3

CATALYST FOR REDUCING NITROGEN OXIDES AND PROCESS FOR MAKING THE CATALYST

BACKGROUND OF THE INVENTION

1. Field of the Invention

This invention relates to a catalyst for reducing nitrogen oxides in the exhaust gas with ammonia. More particularly it relates to a catalyst for removing nitrogen oxides which has a high strength, a suitable elasticity and a good durability against sulfur oxides in the exhaust gas.

2. Description of the Related Art

As a catalyst for removing nitrogen oxides contained in exhaust gases, that obtained by molding a catalyst composition consisting of titanium oxide ($TiO_2$) and at least one of oxide(s) of molybdenum (Mo), tungsten (W), vanadium (V), etc. into a granular form, a plate form, an honeycomb form a the like has been used. Particularly in the case of boiler exhaust gases generated by burning heavy oil, coal, etc. as fuel, it is necessary to treat a gas containing a large quantity of soot or ashes at a small pressure loss. Thus, catalysts having passages parallel to the gas flow direction, such as a combination of plate form catalysts, a honeycomb-form catalyst having a high percentage of openings, etc. have been used. Specific examples of catalysts proposed in this context are as follows: a catalyst obtained by coating a catalyst composition onto a metal substrate (Japanese patent publication No. Sho 61-28377), a catalyst obtained by extrusion-molding a catalyst composition into a honeycomb form (Japanese patent publication No. Sho 60-3856, etc.), a catalyst obtained by molding a ceramic fiber mat or paper into a honeycomb form, followed by coating a catalyst precursor onto the molded material (Japanese patent publication No. Sho 58-11253) etc.

Among the above catalysts, the catalyst produced by coating a catalyst composition on a metal substrate is superior in that, since a flat plate part occupies most of the product, the pressure loss is so small that ashes barely accumulated. There are drawbacks in that it is heavy and the metal substrate is likely to be oxidized.

As for the product obtained by molding the catalyst compounds into a honeycomb form by means of an extrusion molding process, its dimensions are restricted to less than about 150 square mm due to the limitations of the strength of material and the molding technique. Hence, it has been necessary to stack a large number of the molded products in a large capacity apparatus having a volume of several hundred cubed meters. A further drawback has been that the molded product has a low impact strength.

The product obtained by coating a catalyst composition onto the surface an inorganic fiber sheet or paper has a high impact strength; on the other hand, a drawback has been that its mechanical strength is so low that it is abraded by ash particles contained in exhaust gases. Further, in the case of exhaust gases containing acidic gases, it is sometimes corroded, thereby reducing its strength.

SUMMARY OF THE INVENTION

The object of the present invention is to provide a catalyst which overcomes the problems of the prior art and has a high strength together with a light weight, is suitable to a large capacity denitration apparatus, and is resistant to exhaust gases containing acidic gases.

According to the first aspect of the present invention, a catalyst is provided for reducing nitrogen oxides in the exhaust gases with ammonia, the catalyst composition is coated on an inorganic fiber cloth, wherein the inorganic fiber cloth is impregnated with at least one inorganic oxide selected from silica and metal oxides of the catalyst composition so that the weight ratio of the inorganic oxide to the inorganic fiber cloth is in the range of 0.05 to 0.8. The inorganic oxide is substantially placed between the fibers constituting the inorganic fiber cloth.

The ratio of the diameter of the particles of the above inorganic oxide preferably to the diameter of said inorganic fiber is preferably 0.2 or less.

If the ratio of the diameter of the particles of the inorganic oxide to the diameter of the inorganic fibers exceeds 0.2, the sticking effect of inorganic oxide particles is insufficient. If the ratio of the weight of the particles of the inorganic oxide to the weight of the inorganic fiber cloth is less than 0.05, the effect to the catalyst is inconsequential, while if the ratio exceeds 0.8, the abrasion resistance is inferior and the catalyst is in a saturated state.

BRIEF DESCRIPTION OF THE DRAWINGS

FIG. 1 illustrates the catalyst composition of the present invention.

FIG. 3 illustrates a load-displacement curve of the catalyst of the present invention.

Figure 2:
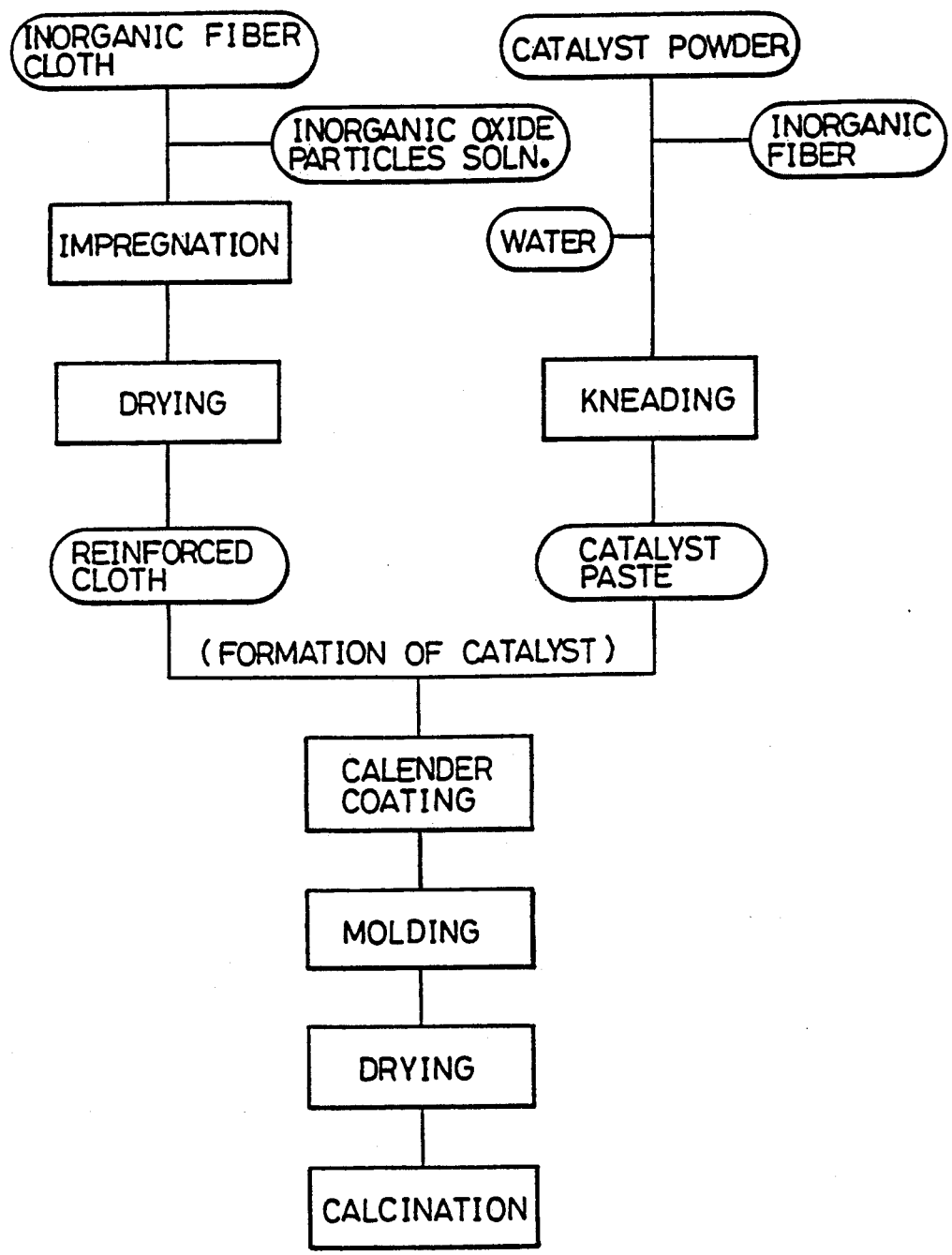
FIG. 2 illustrates the process for producing the catalyst of the present invention.

According to the first aspect of the present invention, by applying a catalyst composition in a slurry or paste state onto an inorganic fiber cloth containing fine particles of inorganic oxides, followed by subjecting the resulting material to a pressurebonding step like calendering and then drying and calcining, it is possible to obtain a catalyst body. The body consists of a substrate of the inorganic fiber cloth wherein the fiber clearances are filled with the fine particles of the inorganic oxides and the catalyst layer coated thereon, thereby increasing the strength and durability of the catalyst.

In order to observe the effectiveness of impregnation of inorganic oxide particles in inorganic fibers, impregnated glass fibers are obtained by impregnating E glass fibers (fiber diameter: 9 μm, main components: $SiO_2$ 52–56%, $Al_2O_3$ 12–16%, CaO 12–25%, MgO 0–6%, $B_2O_3$ 8–13%, each by weight) with an $SiO_2$ sol (particle diameter: $7-9 \times 10^{-2}$ μm), followed by calcination at 550° C./2h, the ratio by weight (fine particles of $SiO_2$ sol/glass fibers) after the calcination being about 0.12. As a result, it has been observed by an electronic microscope that the filaments or fibers have fine particles of the $SiO_2$ sol filled in the clearances therebetween to prevent direct contacts of single fibers with one another from occurring. And yet, as the fine particles of the oxide disperse between the fibers, they do not restrain the movement of the fibers themselves. Under such a condition, the strength of the catalyst is maintained, even at high temperatures. Further, since the restraint of the fibers is mild, the bundle of fibers has a suitable elongation and softness. Thus, the catalyst using fibers impregnated with fine particles of the inorganic oxide is provided with both strength and elasticity.

The impregnation of inorganic oxides is preferably carried out in addition of an organic binder like polyvinyl alcohol.

In the case where the exhaust gas includes acidic gases such as sulfur oxides, it is preferable to treat the inorganic fiber cloth with a mineral acid like hydrochloric acid, sulfuric acid or nitric acid to form a surface layer deficient in almina and alkaline earth metal (i.e. calcium) oxide. This treatment may be carried before or after the impregnation of the inorganic oxides, the latter being preferable.

According to the second aspect of the present invention, a catalyst is provided for reducing nitrogen oxides in an exhaust gas containing acidic gases with ammonia. A catalyst composition is coated on an inorganic fiber cloth, wherein the above inorganic fiber cloth comprises fibers containing silica, alumina and alkaline earth metal oxide, and the inorganic fiber has a surface deficient in alumina and alkaline earth metal oxide.

The present inventors have researched the causes of strength reduction of a catalyst for purifying exhaust gases when a general-purpose glass fiber cloth is used because of sulfur oxides ($SO_x$) in the exhaust gases, and have found that in the case where an alumina and an alkaline earth metal and oxide are contained in the cloth, they react with acidic gases in the exhaust gas, thereby resulting in strength reduction. In other words, the main cause of strength reduction is because CaO and $Al_2O_3$ in the glass fibers react with $SO_3$ to form $CaSO_4$ and $Al_2(SO_4)_3$, which cause the fibers to stick to one another thus inhibiting movement of the fibers. Consequently, the fibers break easily by elongation, bending or heating. According to the second aspect of the present invention, by immersing the glass fiber cloth in a mineral acid like hydrochloric acid, nitric acid or sulfuric acid to form a layer deficient in aluminum and calcium on the surface thereof, followed by applying catalyst compounds thereto, it is possible to prevent the fibers from sticking to one another due to the formation of Ca- or Al-compounds and to obtain a catalyst retaining a high strength for a long time in the exhaust gases containing acidic gases.

If CaO and $Al_2O_3$ in the central part of the fibers are removed by acid-immersion, the strength is adversely reduced to make it impossible to stand up to any practical uses. So it is important to remove CaO and $Al_2O_3$ mainly on the surface layer of the fiber or cloth.

In the second aspect of the present invention, the glass fiber cloth, as it is, or after impregnated or coated with a slurry containing an inorganic oxide like silica or titania and an organic binder, is immersed in an aqueous solution of 3 to 10% by weight of an acid such as hydrochloric acid, nitric acid, sulfuric acid and treated on heating to about 50° to 100° C. for 3 hours to dissolve a portion of CaO and $Al_2O_3$ out of the fiber cloth. The resulting cloth is then washed with water, dried and used as the catalyst substrate.

By means of the above treatment, the cloth is stiffened; therefore the acid treatment and water-washing operations become easy and it is also possible to prevent the cloth from shifting at the time of molding.

Onto the thus obtained cloth is applied a paste prepared in advance by adding water to a known catalyst powder of titanium oxide, molybdenum oxide, vanadium oxide, tungsten oxide, etc. by press means such as a calender roll so as to fill the interstices of the cloth and coat thereon. The resulting plate-form catalyst is dried as it is, or molded while dried by means of a heated mold, and processed into a catalyst having an optional shape. This catalyst is further calcined at 400° to 600° C. in accordance with the catalyst component. In the above manner, the catalyst of the present invention is obtained, and in the production of the catalyst, by mixing inorganic fibers into the catalyst paste, the mechanical property of the resulting catalyst can be improved.

The inorganic fiber cloth used in the present invention can be obtained by bundling inorganic filaments of 3 to 20 μm in diameter with a bundling agent such as starch, plastic emulsion, etc. into 200 to 800 ends, followed by twisting these ends into about 5 to 10 ends and weaving these in the longitudinal and lateral directions. The cloth consisting of yarns obtained by twisting a large number of inorganic filaments has a very high strength and also a superior heat resistance due to the inorganic material.

A glass fiber cloth is preferably used as the inorganic fiber cloth. Most preferred is a glass fiber cloth composed of the so-called non-alkali glass-made fiber-twisted yarns (such as E glass, T glass). The fiber diameter, the weaving manner, etc. have no particular limitation, but for example, a product obtained by twisting 1,000 to 2,000 ends of E glass-made filaments of several μm in diameter into one yarn, followed by plain-weaving a number of such yarns, affords good results.

In the present invention, the catalyst composition preferably comprises titanium oxide and at least one compound selected from those of vanadium, molybdenum and tungsten.

In the first aspect of the present invention, if the inorganic fiber cloth is not impregnated with the slurry of inorganic oxides, when the catalyst is exposed to a high temperature of 300° C. or higher in its practical use, the above-mentioned bundling agent is thermally decomposed to cause contact of the inorganic filaments with one another, so that even when the single filament has a heat resistance, the strength of the catalyst is lessened. With respect to the present invention, since the fine particles of the inorganic oxides have filled the clearances between the filaments constituting the cloth, even when the catalyst is exposed to such high temperatures, the single filaments do not come in contact with one another, thereby obtaining a catalyst having a high strength.

FIG. 2 shows the production process of the catalyst according to the first aspect of the present invention.

FIG. 3 shows a road-displacement curve of the catalyst according to the first aspect of the present invention using an inorganic fiber cloth as compared with the conventional catalyst without an inorganic fiber cloth. In this figure, (a) refers to the conventional catalyst obtained by mixing a catalyst powder with inorganic fibers (catalyst/inorganic fibers: 79/21) and water into a paste having a water content of 23% by weight, followed by subjecting it to calendering by means of rolls and calcining the resulting material at 550° C./2h. On the other hand (b) refers to a catalyst produced in accordance with the present invention, i.e., obtained by application of the paste described above onto an inorganic fiber cloth impregnated with fine inorganic oxide particles, and subsequently subjecting the resulting product to calendering and calcining in the same manner as the above. As seen from the load-displacement curve (case (a)) the conventional catalyst has a flexural strength by itself, but the displacement is small, to afford a hard but brittle structural body. On the other hand, the product of the present invention, obtained by coating a catalyst layer onto a inorganic fiber cloth containing fine particles of an inorganic oxide (case (b)) is superior in both its flexural strength and elasticity. In the structure of the catalyst of the present invention, particles of the catalyst component partially agglomerate with one another and entangle with and adhere onto the inorganic fibers and the inorganic fiber cloth to form a substrate having a very dense and firm texture. As a result, the catalyst is strengthed by the composite reinforcement of the catalyst layer and the inorganic fiber cloth, in addition to the respective strengths thereof. Thus, the strength of the catalyst is higher than that of a conventional catalyst obtained by subjecting a mixture of catalyst components with inorganic fibers to calendering, a product obtained by coating a catalyst composition onto the surface of a ceramic sheet or the like, or a product obtained by merely impregnating a ceramic sheet with a solution of a catalyst composition.

Further, in the first aspect of the present invention, an inorganic fiber cloth is impregnated with the inorganic oxide, preferably silica and/or a catalyst composition followed by placing the resulting material between a pair of porous plate molds, or subjecting it to roll molding, and drying to obtain a dense and high strength catalyst while retaining a definite shape as it is. Thus, it is possible to easily obtain a catalyst body having an optional shape and a large dimension, and it is also possible to produce the objective catalyst by a simple process.

FIG. 1 shows the schematic view of the catalyst according to the second aspect of the present invention. As shown in FIG. 1, catalyst composition 3 fills the interstices of a glass fiber cloth consisting of twisted yarns 1 having a layer 2 deficient in alumina and alkaline earth metal oxide to impart stiffness to the whole of the catalyst. In addition, the glass fibers 14 have a resistance to acidic gases. A superior tensile strength penetrates through to the inside of the catalyst body to yield very high strength and durability as a whole.

Figure 5:
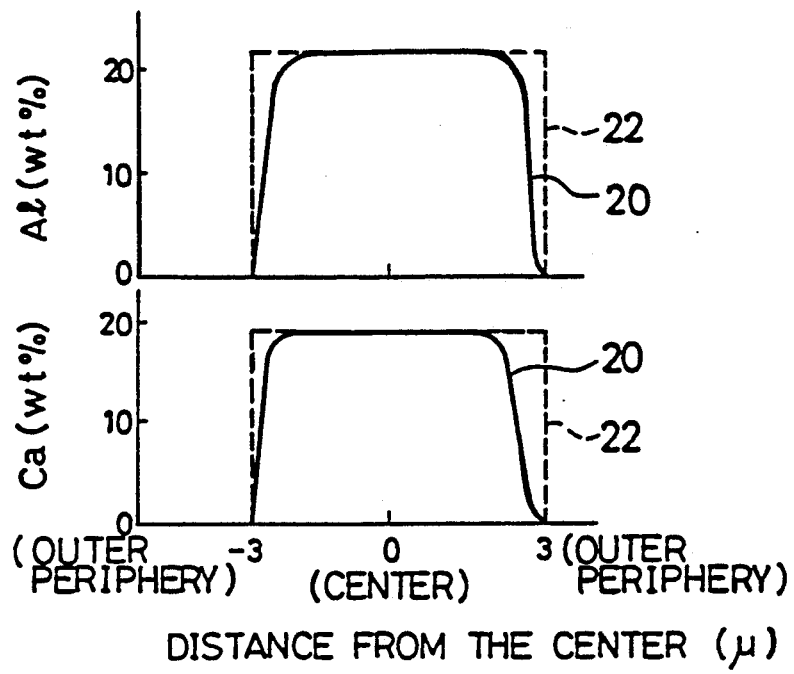
FIGS. 5 and 6 each show a chart comparing the concentration distributions of Al and Ca ($Al_2O_3$ and CaO) in the crosssection of the glass fibers used in the Examples and Comparative Example.

FIG. 5 shows distributions of concentration of Ca and Al in the cross-section of the fiber after acid treatment (20) and concentration of Ca and Al in the cross-section of the fiber when there is no acid treatment (22). As shown in FIG. 5, a surface layer where Ca and Al are almost absent is formed in the case of the fiber after acid-treatment treated with acid. Thus, even when the catalyst is used for purifying exhaust gases containing acidic gases such as SOx, etc., strength-reducing compounds such as $CaCO_4$, $Al_2(SO_4)_3$, etc. are not formed, thereby resulting in high strength of the fibers for a long period.

DETAILED DESCRIPTION OF THE PREFERRED EMBODIMENT

The present invention will be described in more detail by way of Examples. Examples 1 to 7A correspond to the first aspect of the present invention, and Examples 8 to 12 correspond to the second aspect of the present invention.

EXAMPLE 1

To a metatitanic acid slurry (60 kg) according to sulfuric acid process and containing 30% by weight of titanium oxide ($TiO_2$) were added ammonium metavanadate ($NH_4VO_3$) (0.62 kg) and ammonium molybdate (($NH_4$)$_6Mo_7O_{24}$·$4H_2O$) (4.51 kg), followed by kneading the mixture while vaporizing water by means of a kneader heated to 140° C. The resulting paste having a water content of 38% by weight was molded into granules of 3 mm in outer diameter and 10 mm in length by means of an extrusion granulator, followed by drying in a fluidized-fed dryer. The resulting dried granules were calcined at 560° C. for 2 hours while passing air, followed by grinding by means of a hammer mill so as to give a particle size distribution in which particles of 20 μm or less occupy 90% or more, to obtain a powder of catalyst.

Water (3 kg) was added to a mixture of the above catalyst powder (7.9 kg) with inorganic fibers (Kaowool, tradename, 2.1 kg), followed by kneading for 30 minutes by means of a kneader to obtain a catalyst paste having a water content of 23% by weight.

Next, a glass fiber cloth (E glass, 10 ends/inch, 460° C./2h heat cleaning material) was impregnated with a $SiO_2$ sol (particle diameter: $7-9 \times 10^{-3}$ μm) in a particle concentration of 20% by weight, followed by drying at 120° C. The composition of the glass fiber cloth used in Example 1 is shown in Table 1.

TABLE 1

| Component | Weight (%) |
|---|---|
| $SiO_2$ | 52–56 |
| $Al_2O_3$ | 12–16 |
| CaO | 16–25 |
| MgO | 0–6 |
| $B_2O_3$ | 8–13 |
| $R_2O$ | 0–3 |
| $TiO_2$ | 0–0.4 |
| $Fe_2O_3$ | 0.05–0.4 |
| $F_2$ | 0–0.5 |

Figure 7:
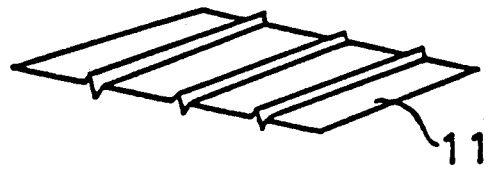
FIG. 7 illustrates an embodiment of the molded catalyst of the present invention.
Figure 8:
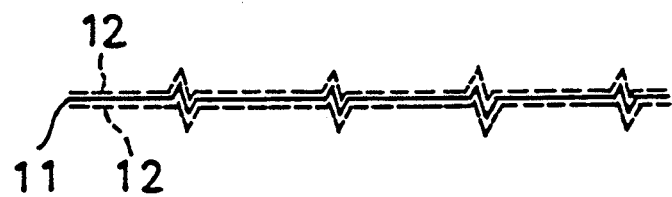
FIG. 8 illustrates a method for molding the catalyst of FIG. 7.

While a material obtained by cutting the above inorganic fiber cloth into 500 mm square was calendered with the above catalyst paste by means of rolls under an applied pressure of 1.4 tons and at a rate of 7.5 m/min and, the paste was coated onto the glass fiber cloth, followed by placing the resulting material between two porous plate molds 12 as shown in FIG. 8, drying at 180° C. for one hour, thereafter removing the molds 12, and calcining in air at 550° C. for 2 hours, to obtain a molded catalyst 11 as shown in FIG. 7.

EXAMPLES 2 AND 3

Example 1 was repeated except that $SiO_2$ sol in Example 1 was replace by a $SiO_2$ sol having a particle diameter of $10-20 \times 10^{-3}$ μm and a concentration of 20% by weight (Example 2) and a $SiO_2$ sol having a particle diameter of $16-20 \times 10^{-3}$ μm and a concentration of 40% by weight (Example 3), to prepare catalysts.

EXAMPLES 4 AND 5

Example 1 was repeated except that $SiO_2$ in Example 1 was replaced by a 60% by weight slurry of $SiO_2$/$TiO_2$/PVA (Polyvinyl alcohol)=14/84/2 (weight ratio) ($SiO_2$ particle diameter: $10-20 \times 10^{-2}$ μm, $SiO_2$ average particle diameter: 0.5 μm) and the same glass fiber cloth (Example 4) and another glass fiber cloth (E glass, 8 ends/inch, 460° C./2h heat-cleaning material) (Example 5), respectively, to produce catalysts.

EXAMPLE 6

Example 1 was repeated except that in place of the SiO$_2$ sol, a 50% by weight slurry prepared by dissolving the catalyst compounds having 0.8 μm in average particle diameter (560° C./2h, calcinated) in water was used, and the same glass fiber cloth as in Example 1 was impregnated with the slurry. The same catalyst paste as in Example 1 was placed between two sheets of the above impregnated glass fiber cloth, and subjected to calendering, to prepare a catalyst.

EXAMPLE 7

Example 6 was repeated except that the catalyst compounds of 0.8 μm in average particle diameter was dissolved in water with a SiO$_2$ sol in a component ratio of SiO$_2$/catalyst compounds = 2/48 by weight (SiO$_2$ being the same as that in Example 2) to prepare a catalyst slurry in a concentration of 50% by weight, to prepare a catalyst.

EXAMPLE 7A

A glass fiber cloth impregnated with the 60 wt. % slurry of SiO$_2$/TiO$_2$/PVA = 14/84/2 (weight ratio) of Example 4 was dried, followed by impregnating a 55 wt. % catalyst slurry, drying the resulting material and applying 2% PVA thereon. Two sheets of the resulting material were calendered so as to place a catalyst paste therebetween, followed by molding by means of a roll press, drying and calcining in air at 550° C. for 2 hours to obtain a catalyst.

Comparative example 1

Example 1 was repeated except that a glass fiber cloth (E glass, 10 ends/inch, bundling agent: phenol resin) was used as an inorganic fiber cloth and no reinforcing treatment with SiO$_2$ sol was carried out, to produce a catalyst.

In the above Examples 1–7, the weight change at the time of having impregnated the glass fiber cloth with fine particles of an inorganic oxide was measured and the weight ratio was calculated according to equation (1) which follows. In addition, particles adhered onto the outer surface of the cloth by impregnation were blown off by a blower and the weight of the oxide particles between the fibers was precisely measured.

Weight of impregnating particles of $$\text{Weight ratio} = \frac{\text{Weight of impregnating particles of inorganic oxide (g)}}{\text{Weight of glass fiber cloth (g)}} \quad (1)$$

Further, the diameter ratio was sought according to the equation (2).

$$\text{Diameter ratio} = \frac{\text{Average diameter of particles of inorganic oxide (μm)}}{\text{Diamter of single fiber of glass fiber cloth (μm)}} \quad (2)$$

In addition, in the case where fine particles of inorganic oxides of more than two components were used, the average diameter of particles having the most coarse particles was used.

Further, the glass fiber cloth and the molded catalyst were cut into a size of 15 mm wide and 50 mm long, and the tensile break strength was determined by means of a precise tensile tester. Further, they were cut into a size of 20 mm wide and 30 mm long and the flexural strength under load was determined and the displaced length was measured by means of a dial gauze.

The obtained results are collectively shown in Table 2. As apparent from the results, the catalysts of the Examples of the present invention are superior in both tensile strength and flexural strength in spite of the use of the same catalyst composition as that of the Comparative examples. This shows that the glass fiber cloth, inorganic oxides particles between the fibers constituting the cloth, catalyst particles, and inorganic fibers for reinforcement in the catalyst form a firm texture of the catalyst to realize a high strength, as well as a suitable stretch and elasticity of the catalyst.

TABLE 2

| Catalyst | Reinforcing agent | Diameter ratio (reinforcing agent/glass fibers) | Weight ratio (reinforcing agent/glass fibers) | Catalyst thickness (mm) | Tensile[*1] strength (kg/15 mm breadth × 1 mm length) | Flexural strength (kg/cm$^2$) | Displaced length in flexural test (mm) |
|---|---|---|---|---|---|---|---|
| Example 1 | SiO$_2$ (size: 7-9 × 10$^{-3}$ μm) | 8.9 × 10$^{-4}$ | 0.12 | 1.2 | 39.6 (17.5) | 221.0 | 3.0 |
| Example 2 | SiO$_2$ (10-20 × 10$^{-3}$ μm) | 1.7 × 10$^{-3}$ | 0.21 | 1.2 | 32.5 (18.0) | 197.5 | 4.0 |
| Example 3 | SiO$_2$ (16-20 × 10$^{-3}$ μm) | 2.0 × 10$^{-3}$ | 0.64 | 1.1 | 29.6 (27.4) | 197.5 | 3.5 |
| Example 4 | SiO$_2$/TiO$_2$/PVA | 5.6 × 10$^{-2}$ | 0.75 | 1.1 | 24.5 (19.6) | 225.0 | 3.2 |
| Example 5 | SiO$_2$/TiO$_2$/PVA | 5.6 × 10$^{-2}$ | 0.80 | 1.2 | 24.0 (21.5) | 185.5 | 3.0 |
| Example 6 | Catalsyt | 8.9 × 10$^{-2}$ | 0.44 | 1.3 | 31.6 (16.5) | 246.5 | 2.3 |
| Example 7 | SiO$_2$/Catalyst | 8.9 × 10$^{-2}$ | 0.48 | 1.2 | 20.0 (15.7) | 176.3 | 2.8 |
| Example 7A | SiO$_2$/TiO$_2$/PVA | 5.6 × 10$^{-2}$ | 0.75 | 1.3 | 42.3 (18.3) | 298.4 | 2.2 |
| Comp. Example 1 | no reinforcing agent | — | — | 1.3 | 4.1 (15.3) | 120.0 | 0.5 |

[*1]Strength of glass fibers impregnated with reinforcing agent

As shown in Table 2, the catalyst of the present invention has a very high mechanical strength and a suitable elasticity. This is due to the fact that the characteristics of the glass fiber cloth are combined with that of the catalyst. In general, glass fibers are weak to abrasion, so in the case where the single fibers composing a bundle of the glass fibers are directly contacted with one another, they are reduced in strength and likely to be broken. Further, in the case where the fibers are put under a severe environment of 300° C. or higher as in the case of the present catalyst, a bundling agent such as starch, etc. protecting the fibers decomposes and loses its effect, resulting in reduction of the fiber strength.

In the present invention, since the clearances between the fibers are filled with a suitable quantity of fine particles of an inorganic oxide so that the fibers may not be contacted with one another and also so that their movement may not be restrained, it is possible to inhibit the reduction in the strength even at such high temperatures.

Figure 4A:
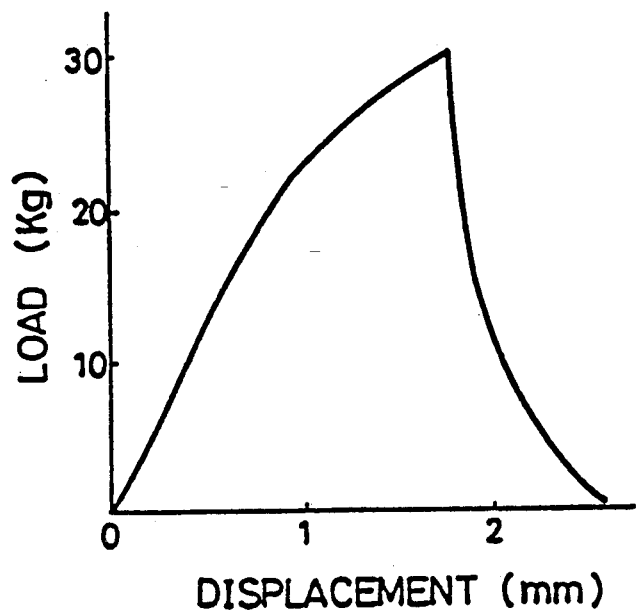
FIG. 4 illustrates a load-displacement curve of the catalyst of the present invention (b) compared to the catalyst for comparison (a).
Figure 4B:
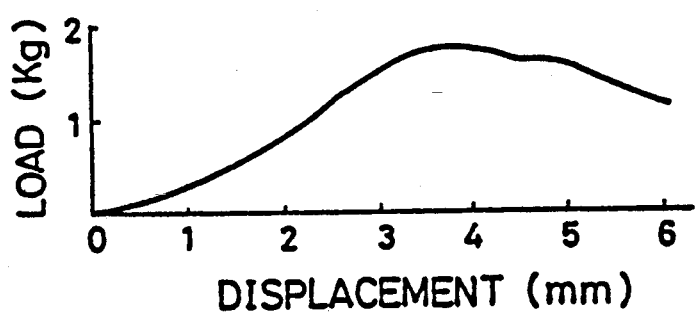

FIG. 4 shows a load-displacement curve of the catalyst of Example 3 of the present invention. In the case of this catalyst, the glass fiber cloth contains fine particles of $SiO_2$ in the above ratio of 0.64; hence there is no brittleness as seen in the case of the Comparative examples, and the glass fiber cloth containing fine particles of an inorganic oxide reinforces the catalyst thereby imparting elasticity.

Further, when catalyst particles are used as the inorganic oxide, as in Examples 6 and 7, the affinity of the glass fibers to the catalyst paste is improved. Thus it is possible to prevent the catalyst layer after molding, from peeling off. This is due to the fact that after the paste has been applied onto the glass fiber cloth, the catalyst particles scattered in the vicinity of the glass fiber surface dissolve in the paste. When they are calcined in this state, the catalyst compounds in the glass fibers are joined to those in the paste. When the catalyst paste is placed between several sheets of the glass fiber cloths containing catalyst particles and they are pressure-bonded, as in the case of Example 6, the catalyst layer is prevented from peeling-off and slipping-off and improved to endure a multi axis stress. That is, by shifting the directions of a plurality of fiber cloths to each other in the pressure-bonding, it is possible to obtain a catalyst enduring a multiaxis stress. Further, even if glass fibers are exposed on the catalyst surface, since the catalyst particles are impregnated between the clearances of glass fibers, the catalyst activity is not lowered. As described above, by using a plurality of glass fiber cloths containing catalyst particles, the strength and the resistance to peeling-off are improved.

Figure 9:
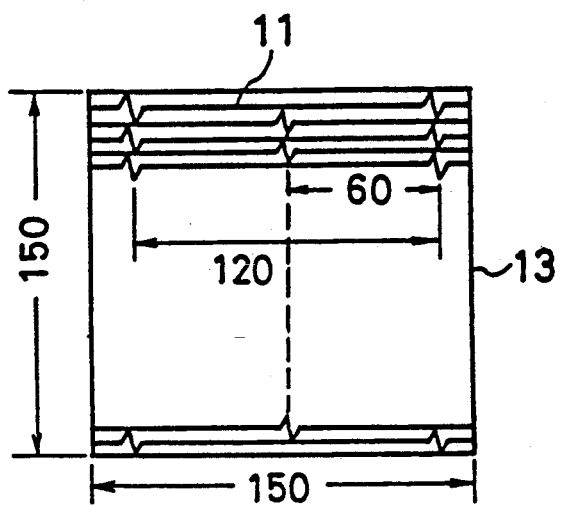
FIG. 9 shows a crosssectional view of a catalyst unit made by stacking the molded catalysts of FIG. 7.

According to the present invention, it is possible to easily obtain a high strength denitration catalyst having elasticity and capable of retaining its shape. Thus, by stacking the molding catalyst 11 as seen in FIG. 9, it is possible to form a catalyst unit 13 having a minimal accumulation of dust and a small pressure loss.

Further, by varying the mold shape of the catalyst, it is possible to prepare a catalyst having a shape of corrugated type, projection and depression type, etc., an optional size as large as 500 mm square or more.

EXAMPLE 8

An E glass-made cloth of 0.5 m×10 m obtained by plain-weaving twisted yarns, consisting of 2,000 ends of filaments of 6 μm in fiber diameter was immersed in a slurry consisting of $SiO_2$ (10 wt. %), $TiO_2$ (50 wt. %), PVA (polyvinyl alcohol) (1 wt. %) and water (the balance), followed by squeezing with sponge rolls and then drying at 150° C. for 30 minutes to form a layer consisting of $TiO_2$ and $SiO_2$ on the fiber surface. The resulting substrate was immersed in 5% hydrochloric acid (70 kg) heated to 60° C., followed by treating the resulting substrate for 2 hours while agitating at an interval of 10 minutes, placing the substrate in a flowing water to wash for 30 minutes and drying at 150° C. Separately, a catalyst powder (Ti/Mo/V=83/5/2 (ratio by atom)), 200 meshes: 90% or less) (20 kg) consisting of $TiO_2$, $MoO_3$ and $V_2O_5$, ceramic fibers ($SiO_2$/$Al_2O_3 \approx 1$) (4 kg) and water (9 kg) were kneaded by means of a kneader to prepare a catalyst paste. This paste was contact-bonded onto the above substrate by means of press rolls so as to fill the interstices thereof with the paste, followed by drying the resulting catalyst sheet of about 1 mm thick at 150° C. and then calcining in air at 550° C. for 2 hours.

EXAMPLE 9-11

Example 8 was repeated except that the concentration of hydrochloric acid was varied to 1, 3 and 10 wt. %, to prepare catalysts.

EXAMPLE 12

Example 8 was repeated except that the hydrochloric acid treatment of Example 8 was carried out before coating with the slurry of $SiO_2$, $TiO_2$ and PVA, to prepare a catalyst.

Comparative Example 2

A catalyst was prepared in the same manner as Example 8 without carrying out the hydrochloric acid treatment.

Comparative Example 3

A catalyst was prepared in the same manner as Example 8 except that the slurry of $SiO_2$, $TiO_2$ and PVA was replaced by silica sol and no hydrochloric acid treatment was carried out, to prepare a catalyst. This example was carried out in order to observe the effect in the case where a silica layer was only formed without acid treatment of the glass fiber cloth.

In order to observe the effectiveness of the present invention, the initial strength of the catalyst, the average quantities of Ca and A in the substrate and their distribution and change of strength in a $SO_3$- containing gas with lapse of time were measured with the catalysts of Examples 8-12 and comparative Examples 2 and 3 as follows:

Strength: Tensile break strength (Size of test piece: 20 mm×50 mm)

Contents of Al and Ca in a substrate: After grinding the substrate, the contents were determined according to a fluorescent X-ray analysis.

Distribution of Al and Ca: Distribution in the cross sectional direction of single fiber was determined by X-ray micro-analyzer.

SOx-resistant test: Atmosphere of $SO_2$ (500 ppm)+$SO_3$ (500 ppm), 400° C.×300 hrs.

Figure 6:
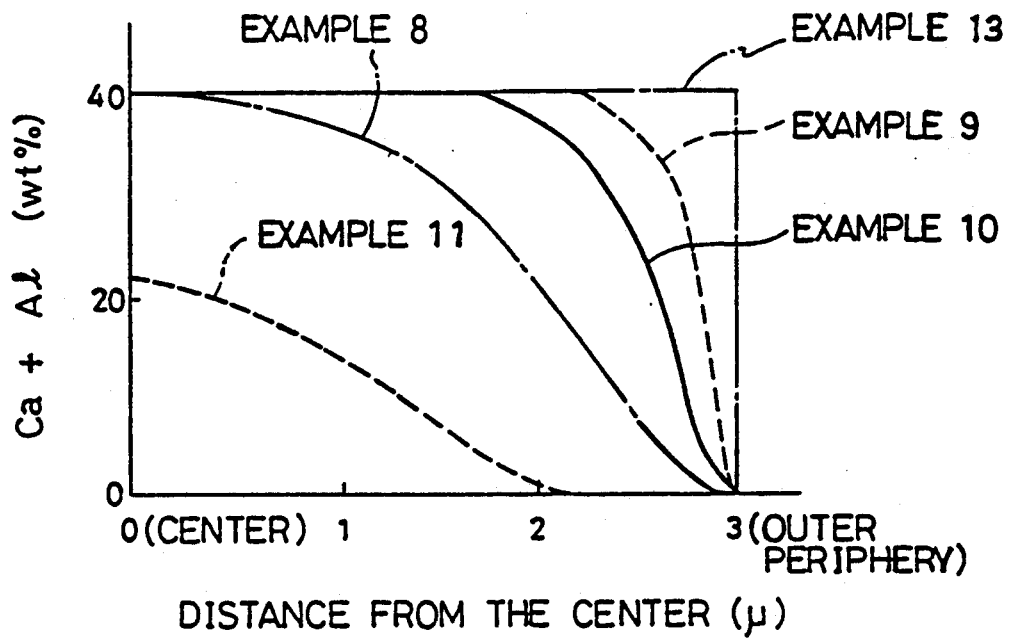

The result are collectively shown in Table 3 and FIG. 6. Table 3 shows the composition of the substrates and the tensile strengths of the catalysts.

TABLE 3

| | Compounds in fibers (wt. %) | | Tensile strength of catalyst (kg/cm) | |
|---|---|---|---|---|
| Catalyst | CaO | $Al_2O_3$ | Initial | After SOx-resistant test |
| Example 8 | 10.5 | 11.6 | 190 | 191 |
| Example 9 | 15.5 | 17.9 | 211 | 203 |
| Example 10 | 12.6 | 14.7 | 187 | 167 |

TABLE 3-continued

| Catalyst | Compounds in fibers (wt. %) | | Tensile strength of catalyst (kg/cm) | |
|---|---|---|---|---|
| | CaO | $Al_2O_3$ | Initial | After SOx-resistant test |
| Example 11 | 1.3 | 1.4 | 124 | 128 |
| Example 12 | 8.2 | 11.0 | 165 | 171 |
| Comp. Example 2 | 18.5 | 22.0 | 185 | 65 |
| Comp. Example 3 | 17.5 | 20.7 | 94 | 45 |

According to the catalysts of Example 8 to 12, a high strength was obtained initially and after the SOx-resistant test. Whereas, according to the catalysts of Comparative Examples 1 and 2 without acid-treatment, a reduction in strength was observed in the SOx-resistant test. As described above, the acid treatment of the second aspect of the present invention is notably effective for improving SOx-resistance.

Further, in the case of the catalyst of Comparative Example 2, the strength is rather low at the initial period and strength reduction due to SOx is also notable. Thus, it is considered that a mere formation of silica coating on the outside cannot prevent strength reduction due to SOx, but the acid treatment according to the present invention is effective for improving durability.

FIG. 6 shows the distribution of CaO and $Al_2O_3$ (the total quantity of Ca and Al) in the fiber cross-section of Examples 8-12. It is seen that even the catalyst of Example 9 having the quantities of Ca and Al slightly reduced (see Table 3) has nearly 0% of the concentration of Ca and Al on the surface layer of the fiber. Thus, it is considered that the strength reduction due to SOx is prevented by the formation of this surface layer.

As described above, according to the second aspect of the present invention, by forming a layer deficient in oxides such as CaO, $Al_2O_3$, reactive with SOx on the inorganic fiber surface, it is possible to prevent the strength reduction of the catalyst due to SOx. As a result, it has become possible to use general-purpose glass fibers such as E glass as a substrate of the catalyst for purifying exhaust gases containing SOx, such as a denitration catalyst for boiler exhaust gases.

What we claim is:

1. A catalyst for reducing nitrogen oxides in an exhaust gas containing acid gases with ammonia, said catalyst having a catalyst composition coated on an inorganic fiber cloth, wherein said inorganic fiber cloth is coated with a mixture of an organic binder and at least one inorganic oxide selected from silica and said catalyst composition, said inorganic fiber cloth comprises fibers containing silica, alumina and alkaline earth metal oxide, wherein only the surface layer of said inorganic fiber cloth is deficient in alumina and alkaline earth metal oxide.

2. A process for producing a catalyst for reducing nitrogen oxides in an exhaust gas containing acidic gases with ammonia, said catalyst having a catalyst composition coated on an inorganic fiber cloth, said inorganic fiber cloth comprising fibers containing silica, alumina, and alkaline earth metal oxide, said process comprising the steps of:
impregnating an inorganic fiber cloth with a slurry containing a mixture of an organic binder and at least one inorganic oxide selected from silica and said catalyst composition to obtain a resulting inorganic fiber cloth;
immersing the resulting inorganic fiber cloth in an aqueous solution of 3 to 10% by weight of a mineral acid to dissolve alkaline earth metal oxide and alumina from only a surface layer of the resulting inorganic fiber cloth, followed by washing and drying to obtain a substrate; and,
applying the catalyst composition to said substrate, followed by drying and calcining to obtain said catalyst.

3. A process for producing a catalyst for reducing nitrogen oxides according to claim 2, wherein said inorganic fiber cloth is a glass fiber cloth.

4. A process for producing a catalyst for reducing nitrogen oxides according to claim 2, wherein said catalyst composition comprises inorganic oxide components of titanium oxide, vanadium oxide, molybdenum oxide, and tungsten oxide.

5. A process for producing a catalyst for reducing nitrogen oxides according to claim 2, wherein said organic binder contains a polyvinyl alcohol.

6. A process for producing a catalyst for reducing nitrogen oxides according to claim 2, wherein said mineral acid is at least one selected from hydrochloric acid, sulfuric acid, and nitric acid.

7. A process for producing a catalyst for reducing nitrogen oxides according to claim 2, wherein said step of immersing the resulting inorganic fiber cloth in the aqueous solution of the mineral acid is carried out while heating to about 50° C. to 100° C. until alkaline earth metal oxide and alumina are dissolved out of only the surface layer of the resulting inorganic fiber cloth.

8. A process for producing a catalyst for reducing nitrogen oxides in an exhaust gas containing acidic gases with ammonia, said catalyst having a catalyst composition coated on an inorganic fiber cloth, said inorganic fiber cloth comprising fibers containing silica, alumina, and alkaline earth metal oxide, said process comprising the steps of:
immersing the inorganic fiber cloth in an aqueous solution of 3 to 10% by weight of a mineral acid to dissolve alkaline earth metal oxide and alumina out of only a surface layer of the inorganic fiber cloth, followed by washing and drying to obtain a resulting inorganic fiber cloth;
coating said resulting inorganic fiber cloth with a slurry containing an organic binder and at least one inorganic oxide selected from silica and said catalyst composition; and,
applying the catalyst composition to the coated fiber cloth, followed by drying and calcining to obtain a catalyst.

9. A process for producing a catalyst for reducing nitrogen oxides in the exhaust gas according to claim 8, wherein said catalyst composition comprises an inorganic oxide component of titanium oxide.

* * * * *